US009064096B2

(12) United States Patent
White

(10) Patent No.: US 9,064,096 B2
(45) Date of Patent: Jun. 23, 2015

(54) METHODS AND APPARATUS FOR SECURE DISTRIBUTION OF PROTECTED CONTENT

(75) Inventor: Daniel Frederick White, Gainesville, GA (US)

(73) Assignee: NCR Corporation, Duluth, GA (US)

(*) Notice: Subject to any disclaimer, the term of this patent is extended or adjusted under 35 U.S.C. 154(b) by 862 days.

(21) Appl. No.: 12/632,211

(22) Filed: Dec. 7, 2009

(65) Prior Publication Data

US 2011/0138486 A1 Jun. 9, 2011

(51) Int. Cl.
G06F 21/00 (2013.01)
G06F 21/10 (2013.01)
G06Q 20/20 (2012.01)
G06Q 50/18 (2012.01)

(52) U.S. Cl.
CPC ........ G06F 21/10 (2013.01); G06F 2221/0711 (2013.01); G06F 2221/2137 (2013.01); G06Q 20/20 (2013.01); G06Q 50/184 (2013.01)

(58) Field of Classification Search
CPC . G06F 21/10; G06F 2221/2121; G06F 21/16; H04L 63/0428; H04L 63/12; H04L 2209/608
USPC ....................................... 726/30; 705/16, 310
See application file for complete search history.

(56) References Cited

U.S. PATENT DOCUMENTS

| 7,356,143 B2 * | 4/2008 | Morten .......................... 380/201 |
| 8,346,807 B1 * | 1/2013 | Diamond et al. ............. 707/783 |
| 2004/0010602 A1 * | 1/2004 | Van Vleck et al. ............ 709/229 |
| 2005/0021995 A1 * | 1/2005 | Lal et al. ........................ 713/200 |
| 2005/0216763 A1 * | 9/2005 | Lee et al. ....................... 713/200 |
| 2005/0234826 A1 * | 10/2005 | Ohmori et al. .................. 705/51 |
| 2006/0021062 A1 * | 1/2006 | Jang ................................. 726/27 |
| 2006/0059104 A1 * | 3/2006 | Ebihara et al. .................. 705/59 |
| 2007/0061886 A1 * | 3/2007 | Le .................................... 726/26 |
| 2007/0220610 A1 * | 9/2007 | Van Loenen et al. ........... 726/26 |
| 2007/0233601 A1 * | 10/2007 | Nakada et al. .................. 705/51 |
| 2008/0034126 A1 * | 2/2008 | Baker ............................. 710/11 |
| 2008/0247543 A1 * | 10/2008 | Mick et al. .................... 380/201 |
| 2009/0012805 A1 * | 1/2009 | Schnell et al. .................... 705/1 |
| 2011/0069836 A1 * | 3/2011 | Rae et al. ...................... 380/259 |

OTHER PUBLICATIONS

W Allasia, D6.2—Design DRM architecture adapted to a P2P network, Jun. 2008; SAPIR Consortium 2006-2008, p. 1-82.*

* cited by examiner

Primary Examiner — Harunur Rashid
(74) Attorney, Agent, or Firm — Peter H. Priest; Joseph P. Mehrle

(57) ABSTRACT

Systems and techniques for protection and delivery of content. Upon initiation of a user account for use in conducting transactions involving delivery of content to a user, digital rights management (DRM) information is created and stored in association with user information. A copy of the DRM information is provided to or made accessible to the user in such a way that the DRM information can made accessible to a suitable playback device to allow playing of content protected with the DRM information. When a user enters into a transaction to receive content, the DRM information associated with the user is used to protect the content before delivery to the user. When the user wishes to play the content, the removable media device storing the user's DRM information must be present in order to allow playing of the content.

14 Claims, 2 Drawing Sheets

METHODS AND APPARATUS FOR SECURE DISTRIBUTION OF PROTECTED CONTENT

FIELD OF THE INVENTION

The present invention relates generally to improved systems and techniques for dispensing of content, such as video and music. More particularly, the invention relates to improved systems and techniques for distributing digital rights management information to a consumer for storage in a secure medium and the contemporaneous or subsequent distribution of content associated with the digital rights management information.

BACKGROUND OF THE INVENTION

Entertainment content is becoming more and more separated from any sort of physical media on which it may be delivered. Modern consumers of entertainment possess numerous devices capable of playing entertainment content, and content may be delivered to these devices in any number of ways. For example, a user's computer may be capable of playing a movie from a DVD, from a removable medium such as a memory card, from a file stored on the user's hard drive, from a remote source streamed over an Internet connection, or in any number of other ways. Providers of content to consumers hope to receive payment for providing such content, and one way for providers to insure payment is to limit the number of playable copies of a particular item a user may play at any one time, or to otherwise insure that a user may play content only in ways and at times acceptable to the provider.

One way in which providers control a user's playing of content is through the inclusion of digital rights management (DRM) information with the content. A copy of a content item is stored a user's device in such a way that the content item is protected using DRM information, and the DRM information needed to play the device is stored on the device onto which the copy is recorded. This DRM information, which may also be accompanied with control information specifying the conditions under which the content item may be played, is stored in a protected area and used to enable playback of the content. One frequently used mechanism for protection of content is to use or create DRM information that includes an encryption key stored in a protected area of a device inaccessible to a user and to encrypt and decrypt content using the encryption key. In playing or using the content, the encryption key may be used to decrypt content as it is streamed from the device, so that the content needed for playing can be decrypted, but a complete decrypted copy of the content is never present.

Because they frequently own many different devices, users may wish to store content on whatever device they wish, even if they accept the restriction to play the content on only one device at a time, or during an agreed upon period, but if a provider delivers content to multiple devices, each with DRM adapted to the device to which the content is delivered, the provider risks losing control over the content.

SUMMARY OF THE INVENTION

In its several aspects, the present invention provides improved systems and techniques for delivering DRM protected content to consumers separately from the DRM information and other data needed for playing the content. A provider stores DRM information in a location or on a device in such a way that the DRM information can be accessed by the user to play content protected using the DRM information, and the DRM information can be transferred to different playback devices separately from the content protected using the DRM information. In one example, a copy of DRM information associated with a user may be stored in a user's removable media device, such as a secure digital card, with a copy of this DRM information being identified with the user and stored in a secure central location accessible to the provider. When a user wishes to receive content, he or she furnishes information needed for the provider to encrypt or otherwise protect content using his or her DRM, for example by logging on to a user account or by providing the secure digital card storing his or her DRM to a device delivering content. The content is encrypted with the user's DRM information and delivered to the user in the manner desired. In order to play the content, the user must insert the medium storing his or her DRM information into the device playing the content. The DRM information may also be managed in such a way that copies can be transferred between devices. For example, a removable media device on which the DRM information has become corrupted can be presented to allow verification that the DRM information can no longer be used, and a new copy may be stored on another device. A copy of DRM information may be stored in a user's computer and stored on a recordable device presented at the user's computer under conditions established by a provider, such as removing the DRM from the computer after storing it to the device. Many other mechanisms for allowing the use of DRM information under conditions established by a provider may be employed.

A more complete understanding of the present invention, as well as further features and advantages of the invention, will be apparent from the following Detailed Description and the accompanying drawings.

DETAILED DESCRIPTION

Figure 1:
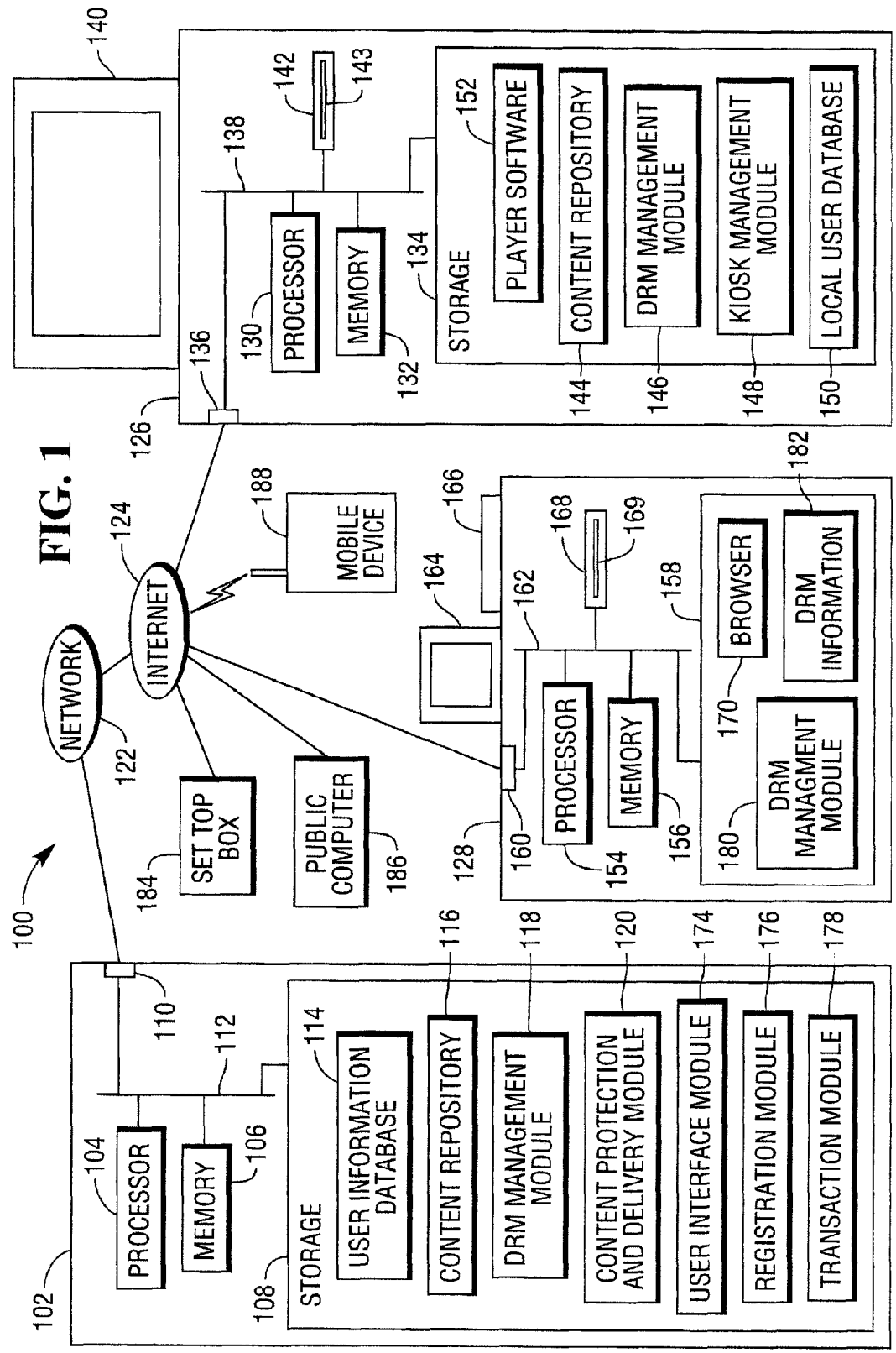
FIG. 1 illustrates a content protection and delivery system according to an aspect of the present invention.

FIG. 1 illustrates a content delivery system 100 according to an aspect of the present invention. The content delivery system 100 comprises a central server 102 comprising a processor 104, memory 106, and storage 108, as well as a network interface 110, all communicating over a bus 112. A user information database 114 resides on the storage 108, and includes a plurality of user records, with each user record identifying a user and storing DRM information associated with the user. The user record for a user also stores information relating to the delivery and status of one or more copies of the DRM information that have been delivered to the user. For example, one convenient mechanism for delivery of DRM information to a user is to store the DRM information on a removable media device, such as a secure digital card, to which user DRM information has been written. The user is able to place the removable media device in a suitable interface of a playback device, and the playback device will then have access to the user's DRM information and can use the DRM information to allow playback of content that has been protected with the same DRM information.

For example, suppose that a user is given DRM information stored on a secure digital card, and the user at the same time or subsequently receives a copy of protected content that is stored on his or her portable player with a secure digital interface slot. The content can be stored on the player, and can remain on the player, but cannot be played unless the user places the secure digital card storing a copy of the DRM information into the secure digital interface slot of the player. When the secure digital card is present, the player is then able to use the DRM information stored on the card to allow playback of the content that is stored on the player.

As discussed in greater detail below, numerous different mechanisms for delivery of DRM information to a user may be employed, with each such mechanism providing features and controls to prevent a user from having access to more than a predetermined number of active copies of a user's DRM information at any one time.

The central server 102 has access to a content repository 116, which may reside in the storage 108 or elsewhere. The central server 102 employs a DRM management module 118, suitably implemented as software residing in the storage 108 and transferred to memory 106 as needed for execution by the processor 104. The server 102 also employs a content protection and delivery module 120. The DRM management module 118 creates and stores sets of DRM information associated with authorized users, so that a user providing or having access to an appropriate set of DRM information can play or use content protected with that DRM information.

The server communicates with a plurality of content delivery destinations over a network 122, which may provide access to the public Internet 124. Exemplary destinations are a kiosk 126 and a user's home computer 128, but it will be recognized that many more delivery destinations, in a wide variety, may be supported.

The kiosk 126 includes a processor 130, memory 132, storage 134, and network interface 136, communicating over a bus 138. The kiosk 126 also includes a display 140, which may be a touch screen display, and a media interface 142. A removable media device 143 is shown as inserted into the interface 142. The DRM management module 118 creates DRM information, a copy of which can be stored on the removable media device 143. The removable media device 143 can then be removed from the interface 142 and taken with the user. When the removable media device 143 is inserted into a compatible playback device, the DRM information stored in the device 143 is accessible to the playback device, and enables the playback device to play or otherwise make accessible for use content protected with the same DRM information of which a copy is stored in the device 143. The removable media device 143 can be moved from one playback device to another, so that a user may have multiple devices on which a copy of the same content may be stored, but can play the content on any particular device only when the removable media device 143 is present.

A content repository 144 may reside on the storage 134, comprising a plurality of recorded titles available for transfer to media or devices provided by the user. The kiosk 126 may communicate with the server 102 to invoke the DRM management module 118, or may alternatively employ its own DRM management module 146, which generates DRM information for storage in association with a user account and stores a copy of the DRM information on a removable device such as the device 143, shown as being present in the interface 142. The device 143 may be a user's own device that is inserted into the interface 142 or otherwise submitted to the kiosk 126 for the creation and storage of DRM information, or may be one of an inventory of removable devices maintained by the kiosk 126 for the purpose of providing a user with a removable medium storing DRM information.

When a user approaches the kiosk, a kiosk management module 148 presents an interface to the user allowing the user to select his or her desired actions. The interface presents a choice allowing the user to indicate whether or not he or she is a new user. If the user is a new user, the kiosk management module 148 invokes the DRM management module 146, which presents an interface requesting the user to insert a media device compatible with the interface 142 or to choose to receive a media device. Upon the selection by the user, the DRM management module 146 creates DRM information, and also creates a user record storing the DRM information in a user record associated with user identification information. The DRM management module also stores the DRM information in a secure area of the removable media device 143, and also directs transmission of the user record to the server 102, which stores the user record in the user information database 114.

The DRM management module 146 may also direct storage of the user record in a local user database 150. The kiosk 126 may also store player software 152 in the removable media device 143. The player software 152 may be stored in a user accessible area of the device 143, and may be freely copied by the user to other playback devices for playing content, or may be executed from the device 143.

The player software 152 provides content playing capabilities and insures compatibility with the DRM used by the system 100, and can be transferred to and executed on any compatible user device, such as a personal computer, portable data device, portable media player, or any other device equipped to execute the player software 152.

The system 100 is capable of delivering, and typically will deliver, content to a user separately from the DRM information used to play the content. Thus, the user may engage in an initial transaction resulting in the creation of DRM information, and then deliver to the user a copy of this DRM information stored to a device such as the device 143, and may separately receive content protected using the DRM information during a subsequent transaction conducted during the same user session or at any time thereafter. The content delivered to the user is protected using the same information previously created for the user and stored on the device 143, but the medium on which the content is delivered does not include the DRM information needed to play the content. This DRM information must be furnished separately by the user at the time the user wishes to play the content. The user may furnish the DRM information, for example, by providing the removable media device 143 to a playback device used to play the content, or the DRM information may be provided in any number of additional ways, for example, by direct interaction of a user playback device with the server 102. The user may thus be allowed to store content on multiple devices, but the content stored on any device can be played only if the device receives the DRM information. The operator of the system 100 is thus able to control the ways in which users play content protected using the system 100, while still providing users with considerable flexibility in their storage and use of the content.

After the user has established his or her user account and DRM information for the user has been created, the user may receive content protected with the DRM information at any time desired. When a user wishes to receive content from the kiosk 126, the user may simply approach the kiosk 126. The kiosk management module 148 presents an interface to the user and the user indicates that he or she has an account and enters identifying information. The user selects the content desired and the content is recorded on an appropriate medium and delivered to the user. The content is protected with the DRM information associated with the user, and this content may also include restrictions on the use of content, such as a time limitation. For example, the content may be playable for two weeks after delivery.

In order to play the content, DRM information associated with the user may be furnished to or be made accessible by the playback device used to play the content. For example, the removable media device 143 storing the user's DRM information may be inserted in a playback device used to play the content, and the playback device will read the information needed to play the content. For example, if the DRM information includes a DRM key, the content will be encrypted using the key. A copy of the DRM key will be present on the media device 143 retained by the user and the key present on the media device will be used to decrypt the content for playing. Alternatively, a playback device may communicate with the server 102 to receive the DRM information needed to play the content. The content may be stored on the playback device or on a medium accessible to the playback device, so that the server 102 only needs to provide the DRM information, rather than the content itself.

The possibility exists that the media device 143 may be lost, or the DRM information stored on the media device may be corrupted. The DRM management module 146 therefore includes capabilities for replacing such lost or corrupted information. If information is corrupted, and the device 143 is sufficiently readable to be specifically identified, the device 143 may be presented at the interface 142 and a new copy of the DRM information may be delivered to the device 143, or, if the device 143 is defective, a new copy of the DRM information may be delivered to a new device placed in the interface 142 after the device 143 has been presented and identified. In addition or as an alternative, a copy of DRM information provided to a user may be time limited, so that a user's DRM information will be automatically invalidated after a predetermined time. If a user retains the device 143 or a similar device, the device 143 may be presented to any kiosk, for example, by placing it in the interface 142, to update the device 143 with current DRM information. Numerous alternative mechanisms for updating DRM information may be used, as discussed below in greater detail. If a user loses the device 143, the user may be permitted to receive new DRM information by presenting a new removable media device, with the delivery being permitted after the invalidation date of the previous copy stored in the lost device. Alternatively, new DRM information may be delivered that will become active only after the DRM information stored on the lost device becomes inactive.

Numerous additional mechanisms may be employed for replacement of lost or defective DRM information, and transfer of a copy from the server to any acceptable device of the user may be permitted, provided that DRM information already stored may be removed or inactivated, or known to be inactive.

A user terminal such as the user computer 128 may be employed in a similar way to the kiosk 126, and may also furnish additional mechanisms for storage and transfer of user DRM information. The computer 128 includes its own processor 154, memory 156, storage 158, and network interface 160, communicating over a bus 162. The computer 128 will also typically include a display 164 and keyboard 166. The computer 128 will also include a removable media interface 168, suitable for accommodating media such as a removable media device 169 compatible with the system 100 and on which DRM information can be stored. The computer 128 may suitably employ a browser 170, allowing for communication with the server 102 over the Internet 124.

The server 102 may suitably employ a user interface module 174, a registration module 176 allowing for initiation of a user account and delivery of DRM information to a user, and a transaction module 178 allowing management of transactions for delivery of content to a user. The server 102 also employs the content protection and delivery module 120, which will receive user selections from an identified user and deliver content to a user device. When a user wishes to register with the system 100 using the computer 128, the user navigates the browser 170 to communicate with a web page maintained by the server 102 or providing access thereto. The server communicates with the browser 170 under the control of the user interface module 174. When the user has indicated that he or she wishes to establish a new account, the user interface module 174 invokes the registration module 176, which receives user inputs for creating an account and stores a user record in the user information database 114.

The user may also employ the computer 128 to receive and manage DRM information that has already been created following a user's interaction with the server 102 by other means, such as through the kiosk 126. Once the user has created an account, the user is able to receive DRM information. The use of the computer 128 provides a number of convenient mechanisms for storage and management of user DRM information. For example, the computer 128 may store a local copy of DRM information, accessible by the user according to conditions established by the proprietor of the system 100. The computer 128 may provide access to the DRM management module 118, residing on the server 102, and may also employ its own DRM management module 180, residing in storage 158. The DRM management module 180 may provide local management of user DRM information, creating and removing copies in the user's local environment, and communicating with the DRM management module 118 to update the user's information with information relating to the status of copies of the user's DRM information.

To take one example, the DRM management module 180 may receive and store a copy 182 of the user's DRM information, which may reside on the computer 128, suitably in an area of the storage 158 that is inaccessible to the user. The DRM information may be used to play content on the computer 128. The user account stored on the server 102 is updated with the information that a copy of the DRM information is present on the computer 128. When desired, the user may receive a portable copy of the user's DRM information by presenting an appropriate removable media device such as the device 169 at the removable media interface 168. The DRM management module 180 stores a copy of the user's DRM information on the device 169, and at the same time removes the copy of the user's DRM information from the computer 128. Alternatively, the DRM management module 180 may simply inactivate the user's DRM information. The user record in the user information database 114 is updated with the information that a copy of the user's DRM exists on the device 169. If desired, the user may be allowed to establish an expiration date for the DRM information stored on the device 169, such as a day or two after its creation, or even a few hours after its creation. Once the expiration date has passed, a user may be allowed to create a new copy of the DRM information on a new removable media device, or to use DRM information stored on the computer 128, even if the device 169 has been lost.

The DRM management module 180 may also store playback software on the device 169, so that any device capable of executing the software may play content delivered using the system 100. Alternatively or in addition, the user may access the server 102 at any time to retrieve desired playback software for use in a playback device.

Once DRM information has been stored to the media device 169, the user may remove the media device 169 and use the device 169 in any compatible playback device with which the user wishes to play protected content received from the system 100.

When the user wishes to receive content delivered to his or her computer 128, he or she uses the browser 170 to make an appropriate selection on a user interface presented by the user interface module 174, and the user interface module 174 responds by invoking the content protection and delivery module 120. The content protection and delivery module 120 selects an appropriate content item, such as a movie, song, or music album, and delivers the content item in a manner specified by the user. Delivery may, for example, include downloading to storage 158 of the computer 128, delivery to a kiosk such as the kiosk 126 for later retrieval by the user, streaming to the computer 128, downloading or streaming to a user's set top box 184, delivery to a publicly accessible computer 186, or any number of other delivery mechanisms. In each case, the content item selected by the user is protected using the DRM information associated with the user before delivery, and the delivered content item can only be played if the user's DRM information is accessible to the device being used for playback. The DRM information required to play content cannot be successfully transferred to another media device without authorization because it resides on portions of the media device inaccessible to the user, so that the provider is able to insure that the user does not benefit from multiple copies of the content at the same time, because the user has only one copy of the DRM information needed to play the content. The user cannot make and distribute multiple playable copies of the content, because copies distributed to others cannot be played without the user's media device 169.

Once a user has established an identity with the system 100, the user may receive content from any suitable location and in any manner desired, and may be allowed to transfer the content to any desired device. Users may receive content at kiosks such as the kiosk 126, at their own computers such as the computer 128, at a publicly accessible computer 186, at a set top box 184, at a mobile device 188, or at any device desired, and the content may be delivered as desired, such as by transferring of stored content, downloading, or streaming. The user can be allowed to make and keep multiple copies, because the user can only benefit from one copy at a time.

The user may communicate with the computer 128, or with the server 102 using the computer 128 or any other suitable device, to receive new or updated copies of the user's DRM, with the devices being used for delivery communicating with one another to insure compliance with restrictions preventing the simultaneous existence of more than one copy, or more than a prescribed number of copies. For example, as discussed above, a user may elect to receive DRM information on a removable media device, with the DRM information becoming inactive after the expiration of a time defined by the user, with the DRM information stored on the computer 128 becoming inaccessible until that expiration time has passed, and with the server 102 being prevented from delivering a new copy of the DRM information until the expiration time has passed. A removable media device may be delivered to a user at the kiosk 126, following the same procedure, or a removable media device may be delivered to a user with a default expiration date. If the removable media device storing DRM information is presented before the expiration date, the DRM information may be erased from the media device and an accessible copy stored on the computer 128, or another device as desired. Whenever a copy of DRM information is generated or removed, the user's record stored at the server 102 is updated to reflect the new status.

Numerous additional mechanisms for controlling playback of content may be employed. For example, during certain times the user may choose not to store any copies of the user's DRM information, choosing instead to communicate with the server to allow playback of protected content. In such a case, content may be stored in the computer 128 or another playback device, which communicates with the server 102 to receive DRM information as the DRM information is needed to play the content. When the user wishes to receive a copy of the DRM information, a copy may be delivered with assurance that no other copy exists. Thus, if the user is assured that he or she can communicate with the server 102, the user can play content as desired without a need to keep track of a copy of the DRM information, and can receive a copy when needed.

Figure 2:
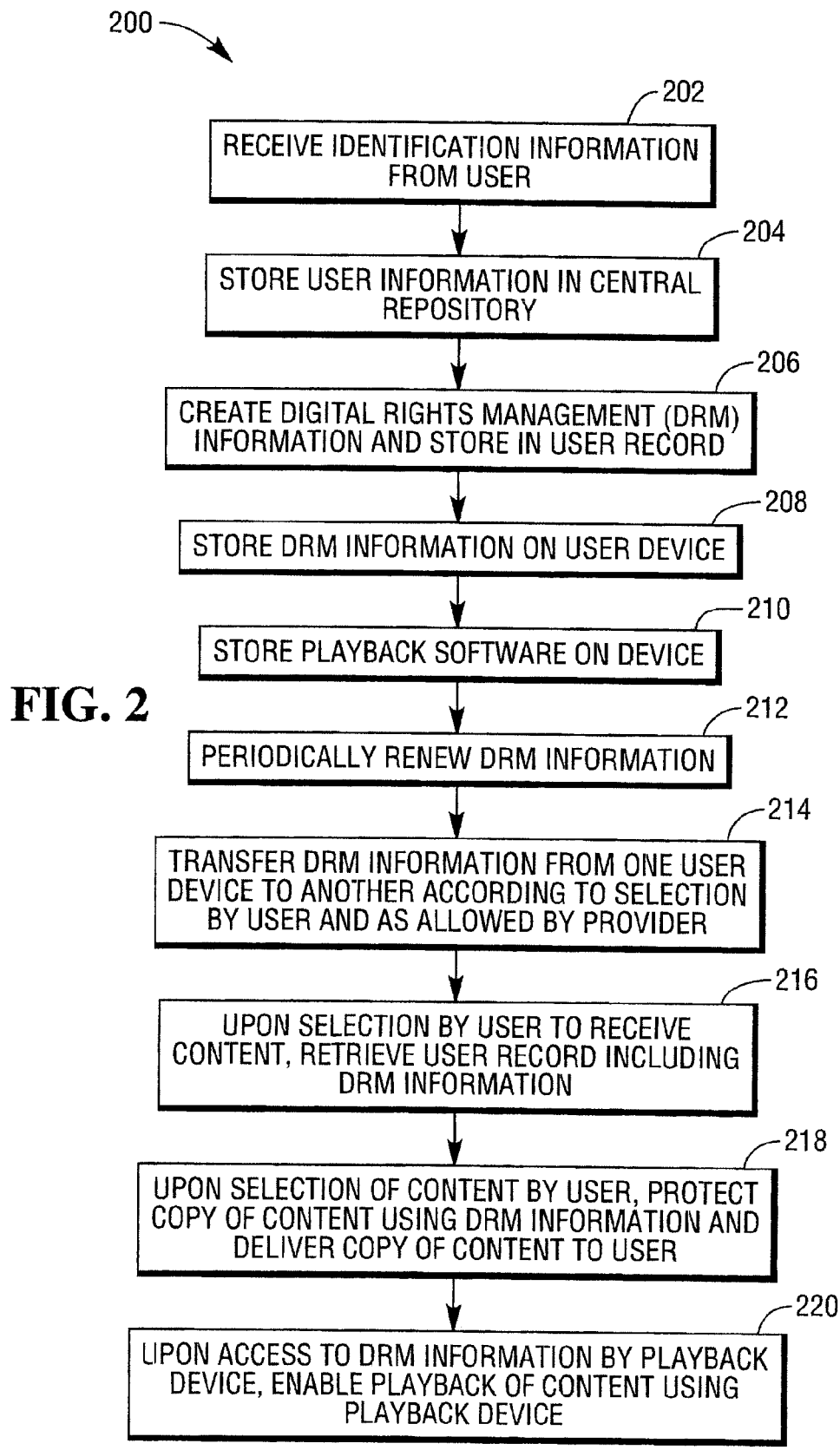
FIG. 2 illustrates a process of content protection and delivery according to an aspect of the present invention.

FIG. 2 illustrates a process 200 of content protection and distribution according to an aspect of the present invention. The process 200 may suitably be carried out using a system such as the system 100 of FIG. 1.

At step 202, identification information is received from a user, suitably through a user interface presented for communication with a content distribution point or central location. For example, a kiosk such as the kiosk 126 might serve as a content distribution point and might present its own interface, and a user's personal computer 128 or set top box 184 might serve as an intermediary for communication with a remote server such as the server 102.

At step 204, a user account is created and the information received from the user is stored in a central repository in association with the account. At step 206, digital rights management (DRM) information is created and stored in a user record associated with the user. At step 208, the DRM information is stored on a user device, such as a user computer or a removable media device. At optional step 210, playback software is stored on the user's device storing the DRM information. At step 212, the DRM information is periodically renewed. At step 214, the DRM information is transferred from one user device to another according to user actions and selections and as allowed by a content provider, for example, by presenting a user device storing the DRM information for removal of the stored DRM information and presenting a new device for storage of the DRM information, or verification that the stored copy of the DRM information is no longer active.

At step 216, upon subsequent selection by the user to receive content and submission of user account identification information, a user record including the DRM is retrieved. At step 218, upon selection of content by a user, a copy of the content is protected using the DRM associated to the user and delivered to the user. The content may be delivered at any delivery point and in any form desired, whether at a delivery kiosk, a personal computer of the user or another party, a user's portable device, a set top box, and may be transferred to a user's storage device, downloaded, streamed, or delivered in any other form desired. At step 220, once the playback device has been given access to the user's DRM information, such as by providing a removable media device storing the DRM information, communicating with a server to receive DRM information, or access to the playback device's own stored DRM information, playback of the content is enabled and the content is played using the playback device into which the removable media device is inserted.

While the present invention is disclosed in the context of a presently preferred embodiment, it will be recognized that a wide variety of implementations may be employed by persons of ordinary skill in the art consistent with the above discussion and the claims which follow below.

I claim:

1. A content protection and delivery system, comprising:
   storage for storing user identification and account information associated with a user; and
   a processor configured for performing functions to: i) receive data associated with a user and create a user account for the user, ii) create digital rights management (DRM) information associated with the user and the DRM information is provided separately to the user before any content is requested for playing by the user, iii) store the DRM information in association with the user account in a user record associated with the user account, the user record stores information relevant to delivery and a status of one or more copies of the DRM information that have been delivered to the user and when a copy of the DRM information is generated or removed, the user record is updated to reflect a new status, iv) use the DRM information associated with the user to encrypt content to be provided to the user such that a playback device is required to have access to the DRM information associated with the user in order to decrypt and play content encrypted using the user's DRM information, v) open a transaction with a user for delivery of content to the user, vi) examine the user account and retrieve DRM information associated with the user account and use the DRM information to protect content selected for delivery in the transaction, vii) deliver a new copy of the DRM information to the user upon receiving an indication that the copy previously provided to the user is inactive, and wherein a copy of the DRM information is stored in a secure area of a removable media device.

2. The content protection and delivery system of claim 1, wherein the removable media device is provided to a user at a point of sale kiosk.

3. The content protection and delivery system of claim 2, wherein the transaction includes downloading of content to a user's device.

4. The content protection and delivery system of claim 2, wherein the transaction includes streaming of content to a user's device.

5. The content protection and delivery system of claim 2, wherein the transaction includes delivery of a removable media device to the user storing protected content playable using the DRM information associated with the user.

6. The content protection and delivery system of claim 1, wherein the processor receives data from a personal computer maintained by the user and stores a copy of the DRM information to a removable media device presented at the personal computer.

7. The content protection and delivery system of claim 1, wherein the copy of the DRM information provided to the user becomes inactive after a predetermined time.

8. A computer implemented method of content protection and delivery, comprising the steps of:
   creating a user account associated with a user and a user record associated with the user account;
   creating digital rights management (DRM) information in association with the user account and providing the user the DRM information before any content is requested by the user;
   storing information relevant to delivery and a status of one or more copies of the DRM information that have been delivered to the user and when a copy of the DRM information is generated or removed, updating the user record to reflect a new status
   in response to a user transaction requesting delivery of content to the user, opening the user transaction with the user for delivery of content to the user, examining the user account and retrieving the DRM information associated with the user account and using the DRM information to protect the content selected for delivery in the user transaction by encrypting the content using the DRM information before delivery to the user such that playing the content requires access to the DRM information to decrypt the content; and
   storing a copy of the DRM information in a secure area on a removable media device, delivering the removable media device to the user, and reading the DRM information by a playback device to which the removable media device is presented to enable playback of the content; and
   delivering a new copy of the DRM information to the user upon receiving an indication that the copy previously provided to the user is inactive.

9. The method of claim 8, wherein the removable media device is presented to the user at a point of sale kiosk.

10. The method of claim 8, wherein the DRM information is stored to a removable media device presented at a personal computer of the user.

11. The method of claim 8, wherein the transaction includes downloading of content to a user's storage device.

12. The method of claim 8, wherein the transaction includes streaming of content to a user's device.

13. The method of claim 8, further comprising a step of insuring that no active user accessible copy of the DRM information exists and, upon such determination, creating a new copy of the DRM information accessible to the user.

14. The method of claim 8, wherein the copy of the DRM information made accessible to the user becomes inactive after a predetermined time.

* * * * *